US010345998B2

(12) United States Patent
Sessak et al.

(10) Patent No.: US 10,345,998 B2
(45) Date of Patent: Jul. 9, 2019

(54) RECOMMENDING DIFFERENT SONG RECORDING VERSIONS BASED ON A PARTICULAR SONG RECORDING VERSION

(71) Applicant: Google Inc., Mountain View, CA (US)

(72) Inventors: Vitor Sessak, Avon (FR); Christian Weitenberner, Venice, CA (US)

(73) Assignee: GOOGLE LLC, Mountain View, CA (US)

( * ) Notice: Subject to any disclaimer, the term of this patent is extended or adjusted under 35 U.S.C. 154(b) by 237 days.

(21) Appl. No.: 15/348,737

(22) Filed: Nov. 10, 2016

(65) Prior Publication Data

US 2018/0129370 A1 May 10, 2018

(51) Int. Cl.
 G06F 3/16 (2006.01)
 G06F 16/74 (2019.01)
 G06F 3/0482 (2013.01)
 G06F 16/783 (2019.01)

(52) U.S. Cl.
 CPC ........... G06F 3/0482 (2013.01); G06F 3/165 (2013.01); G06F 16/743 (2019.01); G06F 16/7834 (2019.01); G06F 16/7844 (2019.01)

(58) Field of Classification Search
 CPC .................... G06F 3/0482; G06F 17/30796
 USPC ................... 715/765, 780, 741, 760
 See application file for complete search history.

(56) References Cited

U.S. PATENT DOCUMENTS 5,809,471 A * 9/1998 Brodsky ........... G06F 17/30796
 348/460
2005/0234992 A1* 10/2005 Haberman ............ G06F 3/0482

FOREIGN PATENT DOCUMENTS

WO 2005101188 A2 10/2005

OTHER PUBLICATIONS

PCT Search Report & Written Opinion, Re: Application #PCT/US2017/054583 dated Dec. 6, 2017. 4 pages.
Written Opinion of the International Preliminary Examining Authority for International Application No. PCT/US2017/054583, dated Oct. 8, 2018, 6 pages.

* cited by examiner

Primary Examiner — Cao H Nguyen
(74) Attorney, Agent, or Firm — Lowenstein Sandler LLP

(57) ABSTRACT

A video content item may be provided to a user in a first area of a graphical user interface (GUI). Related video content items may be provided in a second area of the GUI. A selection of a control element provided in the GUI may be received where the selection of the control element indicates that the user is interested in an audio component that is included in the provided video content item. In response to receiving the selection of the control element, different versions of the audio component that are included in different video content items may be identified and the second area of the GUI may be modified to prioritize a presentation of at least one of the different video content items that includes a respective different version of the audio component over a presentation of the related video content items in the second area of the GUI.

20 Claims, 7 Drawing Sheets

US 10,345,998 B2

RECOMMENDING DIFFERENT SONG RECORDING VERSIONS BASED ON A PARTICULAR SONG RECORDING VERSION

TECHNICAL FIELD

This disclosure relates to the field of song recordings and, in particular, to recommending different song recording versions based on a particular song recording version.

BACKGROUND

A video content sharing platform may provide multiple video content items (e.g., videos) that may be accessed and viewed by users of the video content sharing platform. For example, the video content items may be music videos that include a particular song that is played in the video content item. The video content sharing platform may provide a particular video content item to a user. The user may also be provided recommendations of other video content items that are related to the particular video content item that the user may view.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

Implementations of the disclosure may include a method to provide, to a user, a video content item in a first area of a graphical user interface (GUI) and provide a video content items that are related to the provided video content item in a second area of the GUI. A selection of a control element provided in the GUI and associated with the provided video content item may be received where the selection of the control element indicating that the user is interested in an audio component that is included in the provided video content item. In response to receiving the selection of the control element, different versions of the audio component that are included in different video content items may be identified and the second area of the GUI may be modified to prioritize a presentation of at least one of the different video content items that includes a respective different version of the audio component over a presentation of the related video content items in the second area of the GUI.

In some implementations, the method may modifying the second area of the GUI by providing the presentation of the at least one of the different video content items that includes the respective different version of the audio component before the presentation of the related video content items in the second area of the GUI.

In some implementations, the method may further determine a categorization for the at least one of the different video contents items based on the respective different version of the audio component included in the at least one of the different video content items where the modifying of the second area of the GUI is based on the categorization for the at least one of the different video content items.

In some implementations, the method may further identify a characteristic of the user corresponding to one or more categories associated with viewing video content items where the modifying of the second area of the GUI is further based on the characteristic of the user.

In some implementations, to identify the different versions of the audio component that are included in different video content items, the method may further identify an audio similarity between the respective different version of the audio component that is included in the at least one of the different video content items and the audio component that is included in the provided video content item.

In some implementations, the audio similarity corresponds to similar lyrics used in each of the respective different version of the audio component and the audio component included in the provided video content item.

In some implementations, to identify the different versions of the audio component that are included in the different video content items, the method may further receive one or more keywords associated with the at least one of the different video content items that includes the respective different version of the audio component and identify a match between the one or more keywords and another keyword indicating a categorization of the at least one of the different video content items.

In some implementations, a non-transitory machine-readable storage medium storing instructions may be executed to cause a processing device to perform operations such as providing to a user, a video content item in a first area of a graphical user interface (GUI), providing video content items that are related to the provided video content item in a second area of the GUI, receiving an indication that the user is interested in an audio component that is included in the provided video content item, and in response to receiving the indication, identifying different versions of the audio component that are included in different video content items and modifying the second area of the GUI to prioritize a presentation of at least one of the different video content items that includes a respective different version of the audio component over a presentation of the related video content items in the second area of the GUI.

In some implementations, a system may include a memory and a processing device coupled with the memory. The processing device may provide, to a user, a video content item in a first area of a graphical user interface (GUI), provide video content items that are related to the provided video content item in a second area of the GUI, receive a selection of a control element provided in the GUI and associated with the provided video content item where the selection of the control element indicates that the user is interested in an audio component that is included in the provided video content item, and in response to receiving the selection of the control element, identify different versions of the audio component that are included in different video content items and modify the second area of the GUI to prioritize a presentation of at least one of the different video content items that includes a respective different version of the audio component over a presentation of the related video content items in the second area of the GUI.

BRIEF DESCRIPTION OF THE DRAWINGS

The present disclosure is illustrated by way of example, and not by way of limitation, in the figures of the accompanying drawings.

DETAILED DESCRIPTION

Figure 1:
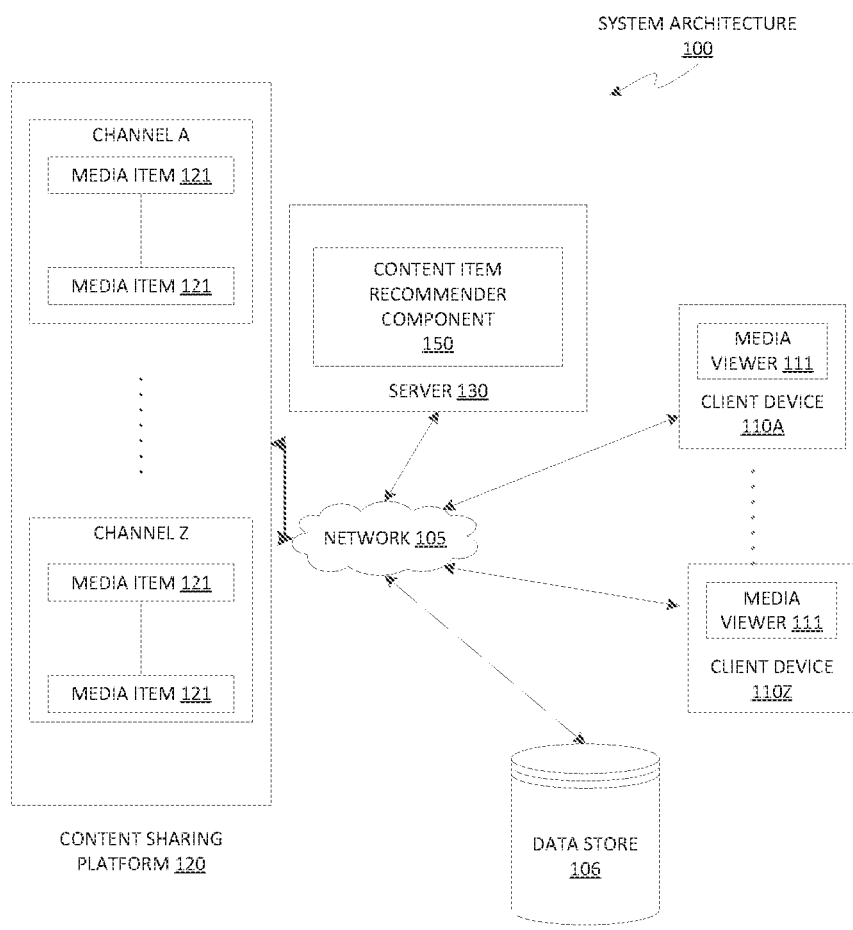
FIG. 1 illustrates an example system architecture in which implementations of the present disclosure may operate.

Aspects of the present disclosure relate to recommending different song recording versions based on a particular song recording version. A content sharing platform may provide multiple video content items (e.g., videos) that may be accessed and viewed by users of the content sharing platform. A video content item may be a music video that includes an audio component that represents an audio portion of the video such as a song recording (e.g., a performance of a song or an opera aria), or the like. Thus, the content sharing platform may provide, to a user of the content sharing platform, a video content item that includes a particular audio component.

The content sharing platform may provide recommendations for the user to view video content items that are related to the provided video content item. The related video content items may include other song recordings that are related to a song recording included in the provided video content item. For example, the related video content items may include other song recordings that are from a same artist or singer or a similar artist or singer who performs the composition in the provided video content item.

The user of the content sharing platform may wish to further explore a particular musical composition (i.e., an audio component) that is included in the provided video content item. For example, the user may be interested in the particular audio component and would like to listen to different versions of the audio component (e.g., different artists or singers performing the same lyrics or musical composition). However, providing a recommendation for a related video content item with a different audio component may not facilitate the exploring of the audio component that is included in the provided video content item as the related video content items may include entirely different audio components with different musical compositions or songs.

Aspects of the present disclosure address the above and other deficiencies by providing a recommendation of related video content items that include different versions of the audio component. For example, each of the related video content items may include a different version of the audio component that is in the video content item provided to the user. The different version of the audio component may correspond to a different performance of the musical composition or song that is included in the provided video content item. The recommendation of the different video content items may be based on prioritizing a presentation of video content items that include a different version of the audio component in a graphical user interface.

For example, the graphical user interface may include a first area that provides a video content item with an audio component. The graphical user interface may further include a second area that includes video content items that are related to the video content item that is provided in the first area of the graphical user interface. In response to an indication that the user is interested in an audio component of the provided video content item, different versions of the audio component (e.g., different performances of the same musical composition) that are included in different video content items may be identified. Subsequently, the second area of the graphical user interface may be modified to prioritize a presentation of at least one of the different video content items that includes a different version of the audio component over a presentation of the related video content items in the second area of the graphical user interface. For example, one or more of the different video content items with a different version of the audio component may be provided in a top portion of the second area or before any of the related video content items are provided in the second area. In some implementations, the presentation of the different video content item may be associated with a highlight or other visual feature that differentiates the presentation of the different video content item over a related video content item.

The presentation of the different video content items may be based on a characteristic of the user and a categorization of the different video content items. For example, as previously described, the different video content items may include different versions of an audio component such as a song recording. Each of the different video content items may be categorized based on the type of the different version of the audio component. For example, the different video content items may be categorized as being associated with cover song versions of the audio component (e.g., a different artist or performer singing the lyrics of a song or a difference performance of a tune or a melody), a fan song version (e.g., another user of the content sharing platform that is singing the lyrics of the song), a live song version (e.g., the same artist or performer singing the lyrics of the song in a live performance setting), etc. The prioritizing of the presentation of the different video content items may be based on the user's interaction with other video content items. For example, if the user prefers or more frequently views different video content items that include fan song versions of the audio component, then the different video content items categorized as fan song versions may be prioritized over the presentation of another video content item associated with a different categorization.

As such, aspects of the present disclosure may recommend different video content items that include a different version of an audio component (e.g., a different performance of a song) that is included in another video content item to aid a user to further explore an interest in the audio component. The recommending of the different video content items is provided in a convenient and user friendly manner that allows the user to indicate his or her interest in different versions of an audio component and then be provided with a presentation in which such different versions are prioritized over other related video content items, thereby eliminating the need for the user to scroll through multiple related video content items and determine which of those related video content items include desired versions of the audio component. This improves the user experience of using the content sharing platform and motivates the user to spend more time on the content sharing platform.

FIG. 1 illustrates an example system architecture 100, in accordance with one implementation of the disclosure. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, network connected televisions, netbook computers etc. In some implementations, client device 110A through 110Z may also be referred to as "user devices." Each client device includes a media viewer 111. In one implementation, the media viewers 111 may be applications that allow users to view content, such as images, videos (e.g., video content items), web pages, documents, etc. For example, the media viewer 111 may be a web browser that can access, retrieve, present, and/or navigate content (e.g., web pages such as Hyper Text Markup Language (HTML) pages, digital media items or content items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media content items (e.g., digital videos, digital images, electronic books, etc.).

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that communicate with the server 130.

In general, functions described in one implementation as being performed by the content sharing platform 120 can also be performed on the client devices 110A through 110Z in other implementations, if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a network connected television, a desktop computer, etc.), data stores (e.g., hard disks, memories, databases), networks, software components, and/or hardware components that may be used to provide a user with access to media items (also referred to as content items) and/or provide the media items to the user. For example, the content sharing platform 120 may allow a user to consume, upload, search for, approve of ("like"), dislike, and/or comment on media items. The content sharing platform 120 may also include a website (e.g., a webpage) that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user." In another example, an automated consumer may be an automated ingestion pipeline, such as a topic channel, of the content sharing platform 120.

The content sharing platform 120 may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed comprised of at least a subset of the content items from all of the channels to which the user is subscribed. Syndicated feeds may also include content items from channels that the user is not subscribed. For example, the content sharing platform 120 or other social networks may insert recommended content items into the user's syndicated feed, or may insert content items associated with a related connection of the user in the syndicated feed.

Each channel may include one or more media items 121 (i.e., content items or video content items). Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as a video content item.

A media item 121 may be consumed via the Internet and/or via a mobile device application. For brevity and simplicity, an online video (also hereinafter referred to as a video content item) is used as an example of a media item 121 throughout this document. As used herein, "media," "media item," "online media item," "digital media," "digital media item," "content," "content item," and "video content item" can include an electronic file that can be executed or loaded using software, firmware or hardware configured to present the digital media item to an entity. In one implementation, the content sharing platform 120 may store the media items 121 using the data store 106.

In one implementation, the server 130 may be one or more computing devices (e.g., a rackmount server, a server computer, etc.). The server 130 may be included in the content sharing platform 120 or be part of a different system. The server 130 may host a content item recommender 200 that identifies different video content items that include a different version of an audio component that is included in another video content item. For example, a graphical user interface that presents a first video content item may be provided to users of the content sharing platform 120. Different video content items that are hosted by the content sharing platform 200 and that include a different version of the audio component included in the provided video content item may be identified. The graphical user interface may then be modified to prioritize a presentation of the different video content items over other video content items. Further details with regard to the content item recommender 200 are disclosed in conjunction with FIG. 2.

Although implementations of the disclosure are discussed in terms of content sharing platforms and promoting social network sharing of a content item on the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, a user's purchase transaction history, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
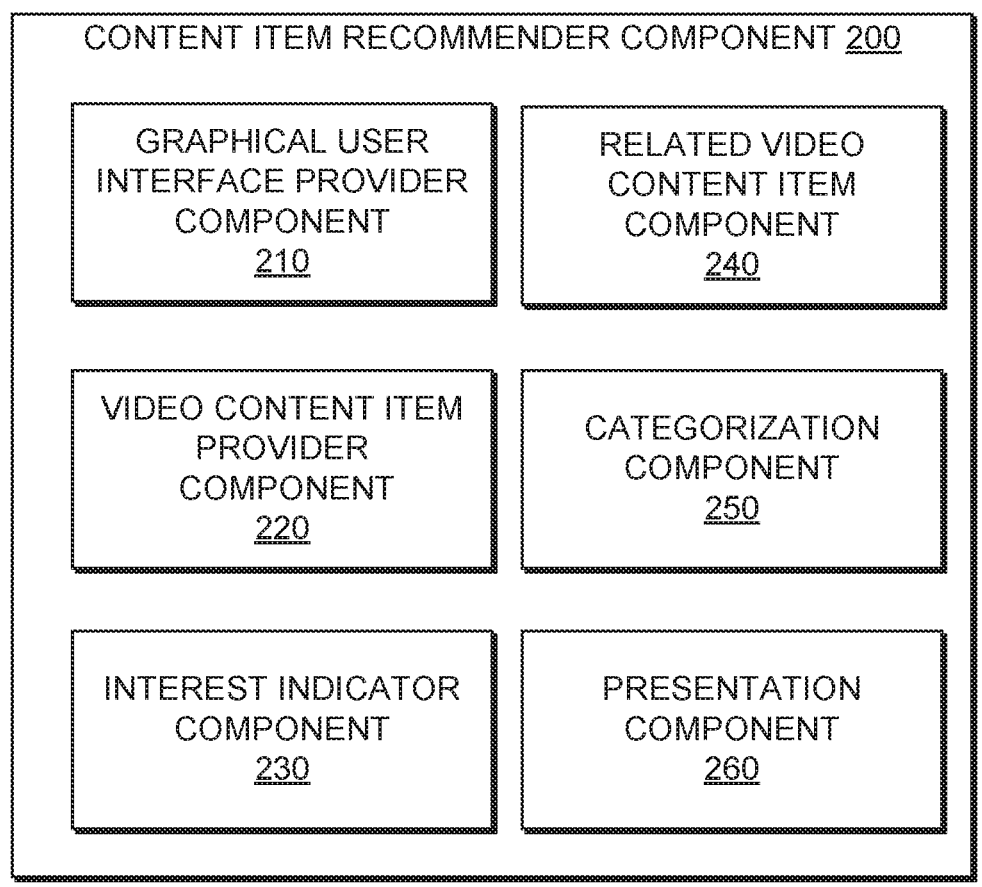
FIG. 2 is an example content item recommender component to prioritize a presentation of a video content item with a different version of an audio component in accordance with some implementations of the present disclosure.

FIG. 2 illustrates an example content item recommender component 200. The content item recommender component 200 may correspond to the content item recommender component 150 of a server system 130 as shown in FIG. 1. The content item recommender component 200 may include a graphical user interface provider component 210, a video content item provider component 220, an interest indicator component 230, a related video content item component 240, a categorization component 250, and a presentation component 260. In alternative implementations, the functionality of one or more of the components may be combined or divided.

As shown in FIG. 2, the content item recommender component 200 may include a graphical user interface component provider 210 that may provide a graphical user interface (GUI) to users of a content sharing platform. The GUI may include a first video content item that is provided to a particular user of the content sharing platform. The first video content item may include a first audio component (e.g., a recording by a particular artist of lyrics of a musical composition). The content item recommender component 200 may further include a video content item provider component 220 that may provide the first video content item to the user. The content item recommender component 200 may include an interest indicator component 230 that may receive an indication that the user is interested in the first audio component that is included in the first video content item that is being presented in the graphical user interface to the user. The indication may be received in response to the user selecting a control element that is provided in the graphical user interface. In the same or alternative implementations, the indication may be received in response to a determination that the user has viewed the first video content item a particular number of times.

The content item recommender 200 may further include a related video content identifier 240 that may identify different video content items that include different versions of the first audio component that is included in the first video content item. For example, different video content items that each include a different version of the first audio component may be identified. The categorization component 250 may categorize or assign a category to each of the different video content items. For example, the different video content items may be identified as cover songs, fan songs, live performances, etc. The categorization may be based on characteristics of the different video content items as described in conjunction with FIG. 5. The presentation component 260 may modify the graphical user interface to prioritize a presentation of one or more of the different video content items that includes a respective different version of the first audio component. The presentation of the one or more different video content items may be prioritized over a presentation of other video content items as described in conjunction with FIGS. 4A-4B. Furthermore, the presentation of the different video content items may be prioritized based on a categorization of the different video content items as described in conjunction with FIG. 5.

Figure 3:
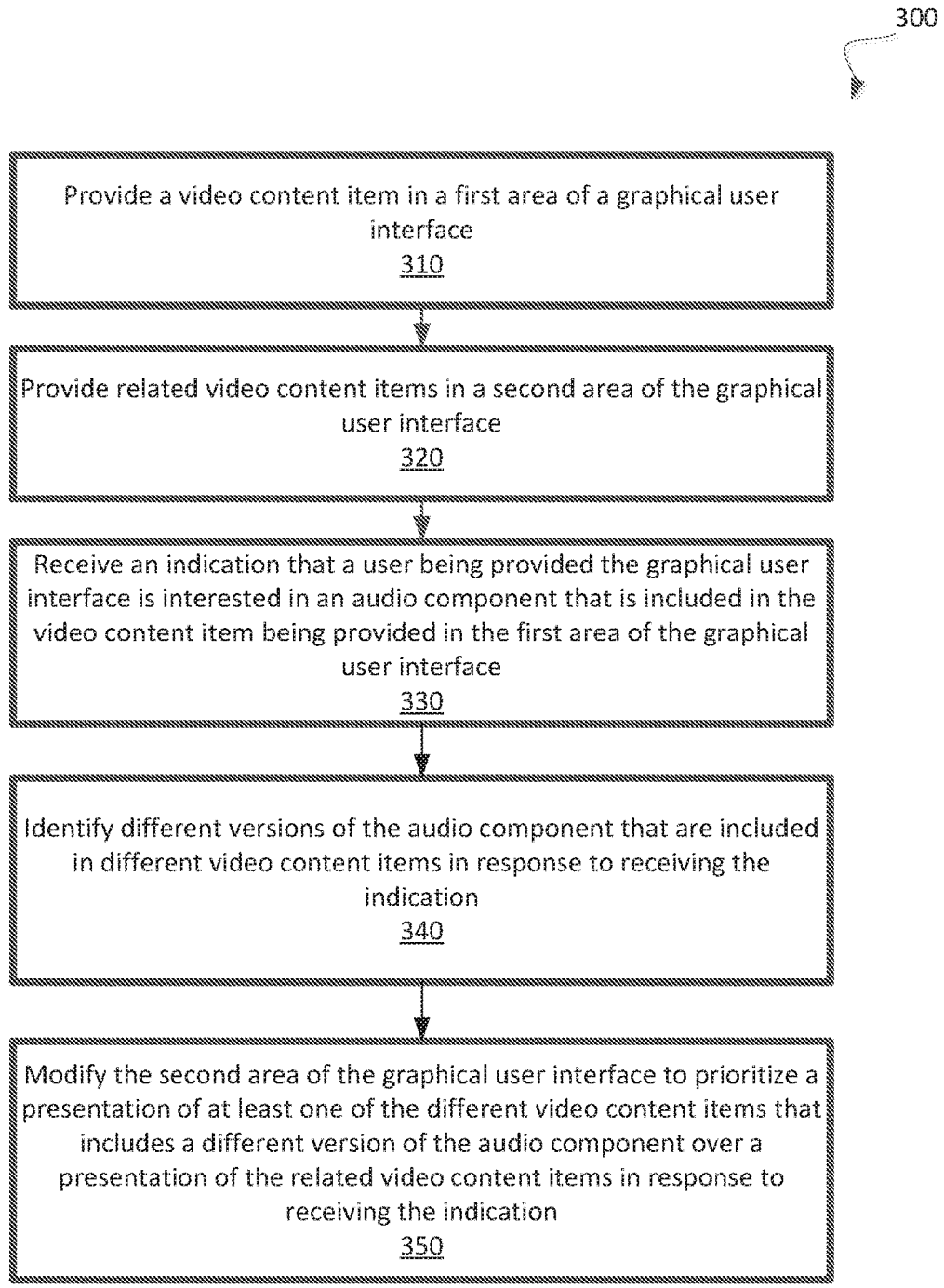
FIG. 3 is a flow diagram of an example method to modify a graphical user interface to prioritize a presentation of a video content item that includes a different version of an audio component in accordance with some implementations.

FIG. 3 is a flow diagram of an example method 300 to modify a graphical user interface to prioritize a presentation of a video content item that includes a different version of an audio component. The method 300 may be performed by processing logic that may comprise hardware (e.g., processing device, circuitry, dedicated logic, programmable logic, microcode, etc.), software (e.g., instructions run on a processing device), or a combination thereof. In some implementations, the method 300 may be performed by the content item recommender component 150 or 200 of FIG. 1 or 2.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

As shown in FIG. 3, the method 300 may begin with the processing logic providing a video content item in a first area of a graphical user interface (block 310). For example, a first video content item may be provided in the first area of the GUI for playback to a user. The processing logic may further provide related video content items in a second area of the graphical user interface (block 320). The related video content items may be a first group of video content items that are recommended to the user that has been provided the first video content item. The related video content items may not include different versions of an audio component that is included in the first video content item. For example, the related video content items may include audio components that have different lyrics or different musical compositions. In some implementations, the related video content items may be provided to the user when the user views the first video content item. The graphical user interface may provide the related video content items as thumbnails or other representations that may be selected to play the respective video content item in the first area of the graphical user interface. The processing logic may further receive an indication that a user being provided the graphical user interface is interested in an audio component that is included in the video content item being provided in the first area of the graphical user interface (block 330). The indication may correspond to receiving a selection of a control element that is provided on the graphical user interface. The control element may be a GUI element (e.g., a graphical icon or button). In some embodiments, the indication may correspond to an indication that the user has viewed the provided video content item a threshold number of times. For example, the indication may be received when the user has viewed the first video content item more than or equal to the threshold number of times and the indication may not be received when the user has not yet viewed the first video content item at least the threshold number of times. Thus, the indication may be received in response to a user selection of a control element provided with the graphical user interface or in response to a frequency of user interaction with the first video content item.

As shown in FIG. 3, the processing logic may further identify different versions of the audio component that are included in different video content items in response to receiving the indication (block 340). For example, audio of each of the different video content items may be analyzed to identify whether the audio of a respective different video content has a similarity with the audio component of the first video content item (e.g., similar lyrics) and a difference with the audio component of the first video content item (e.g., a different performance by a different singer or artist). Thus, each different video content item may include a different version of the audio component that has the same lyrics or musical composition but a different musical performance than the audio component that is included in the first video content item. Furthermore, the different versions of the audio component may be identified based on keywords associated with the different video content items. For example, a video content item may be associated with a title and a description. The different versions of the audio component in the different video content items may be identified based on keywords of the title and the description. For example, if the keywords specify the same title of the first video content item that is provided to a user and/or specifies another keyword (e.g., cover, live performance, fan song, etc.) then the different video content item may be identified as including a different version of the audio component with the same title.

The processing logic may subsequently modify the second area of the graphical user interface to prioritize a presentation of at least one of the different video content items that includes a different version of the audio component over a presentation of the related video content items in response to receiving the indication (block 350). For example, the second area of the graphical user interface may be modified to provide one or more of the different video content items above one or more of the related video content items. In some embodiments, a top portion of the second area may include multiple video content items that include different versions of the audio component while a bottom portion of the second area may include multiple related video content items. Further details with regards to modifying the graphical user interface are described in conjunction with FIGS. 4A-4B.

Figure 4A:
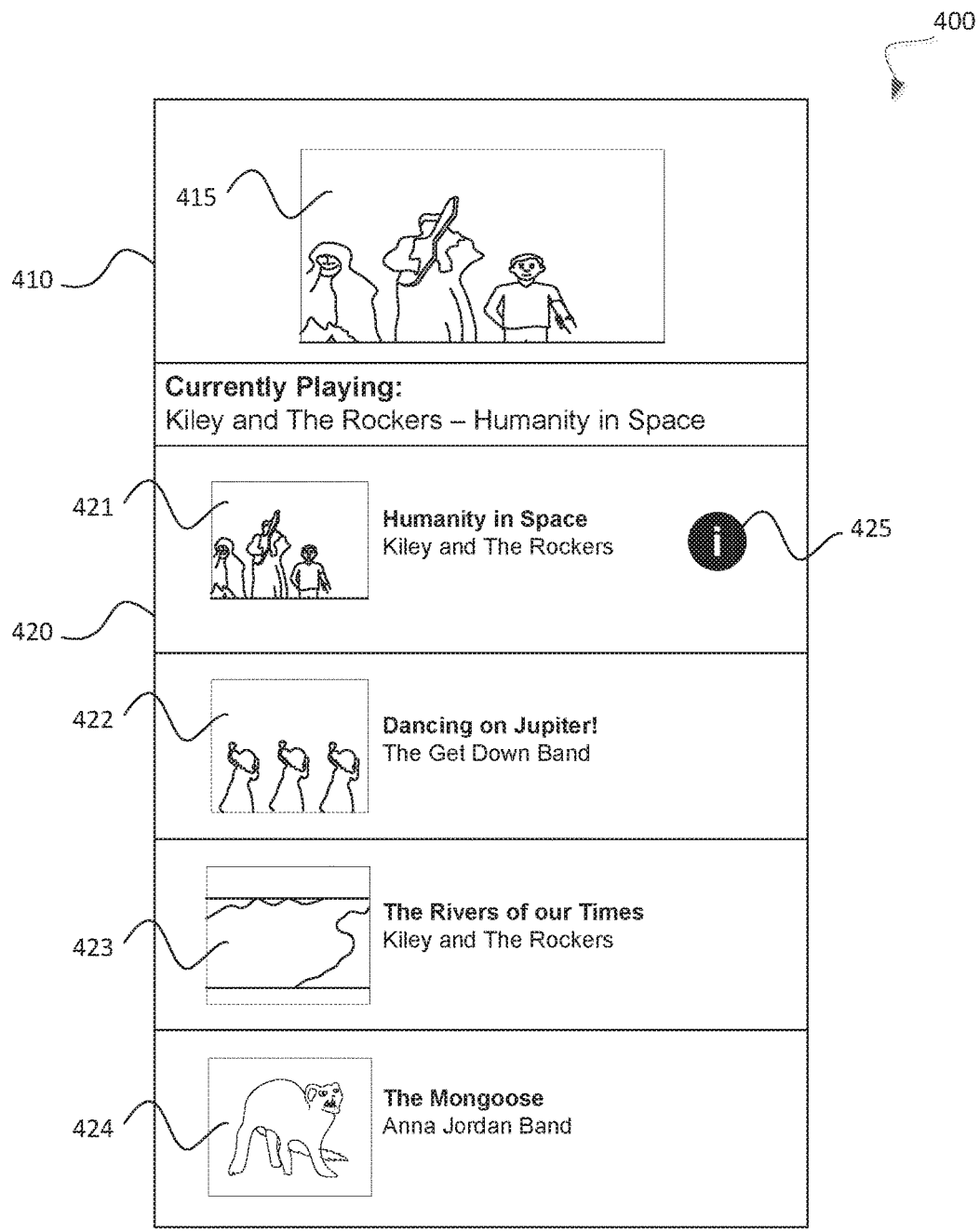
FIG. 4A illustrates an example graphical user interface providing a video content item in a graphical user interface in accordance with some implementations of the present disclosure.

FIG. 4A illustrates an example graphical user interface 400 providing a video content item in a graphical user interface. The graphical user interface 400 may be provided by the content item recommender component 150 or 200 of FIGS. 1 and 2.

As shown in FIG. 4A, the graphical user interface 400 may include a first area 410 that includes or provides a first video content item 415 that may be played to a user in a media player. The first video content item 415 may include a first audio component. The graphical user interface 400 may further include identification information of the first video content item 415 (e.g., the title and artist of the first video content item).

The graphical user interface 400 may include a second area 420 that includes related video content items 422, 423, and 424. The related video content items 422, 423, and 424 may be based on different musical compositions and different songs. The graphical user interface 400 may further include an identification 421 of the first video content item 415 that is provided in the first area 410 and may also include a control element 425 to indicate an interest in the first video content item 415 that is currently being provided in the first area 410. For example, the control element 425 may be selected to indicate the interest in an audio component that is provided in the first video content item 415.

Figure 4B:
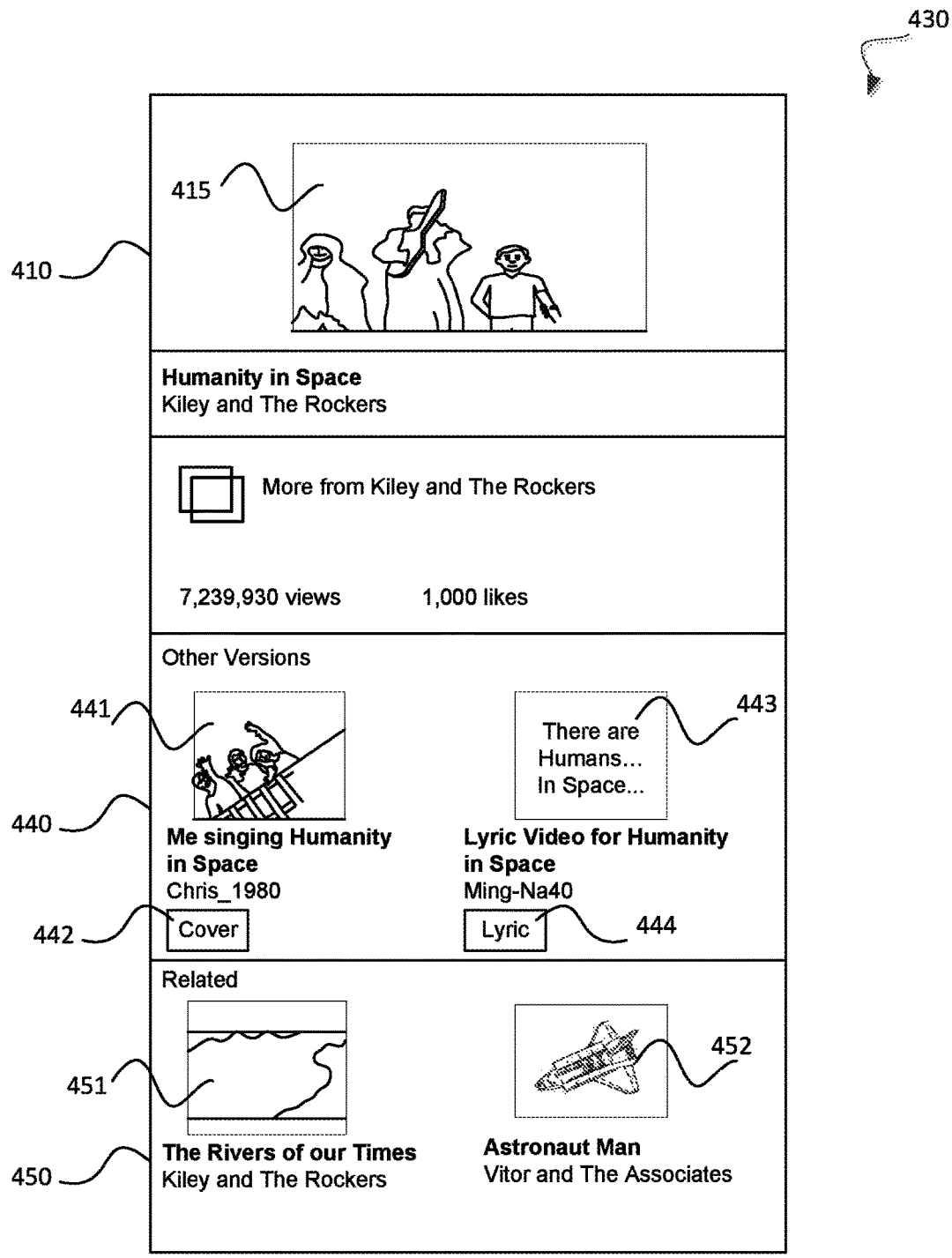
FIG. 4B illustrates an example graphical user interface that has been modified to provide different video content items with different versions of an audio component in accordance with some implementations of the present disclosure.

FIG. 4B illustrates an example graphical user interface 430 that has been modified to provide different video content items with different versions of an audio component of video content item 415. The graphical user interface 430 may be provided by the content item recommender component 150 or 200 of FIGS. 1 and 2. Furthermore, the graphical user interface 430 may correspond to the graphical user interface 400 of FIG. 4A after a selection of the control element 425 has been received or another indication of the user's interest in the audio component of the provided video content item 415 has been received.

As shown in FIG. 4B, the graphical user interface may be modified in response to receiving an indication that the user is interested in an audio component that is included in the first video content item 415. In response to receiving the indication, an updated second area of the updated graphical user interface 430 may include additional information of the provided video content item 415 (e.g., a number of total views) and a first portion 440 of the second area may include different video content items 441 and 443 that include different versions of the provided video content item 415. Furthermore, the first portion 440 may include a label 442 or 444 corresponding to a categorization of the different video content items 441 and 443 as described in further detail with respect to FIG. 5. In some implementations, the video content items provided in the first portion 440 may include other video content items that are associated with context of the first video content item 415. For example, the other video content items may be video content items describing subject matter of the first video content item 415, a commentary video of the first video content item video 415, etc. Thus, the first portion 440 may include one or more video content items that include a different version of the audio component and one or more additional video content items that do not include any version of the audio component. The second portion 450 of the graphical user interface 430 may include related video content items 451 and 452. In some embodiments, one or more of the related video content items in the second portion 450 may be the same as related video content items provided in the second area of the graphical user interface before the indication that the user is interested in the audio component is received. Thus, the different video content items with different versions of the audio component that is included in the provided video content item 415 may be presented over or on top of the presentation of the related video content items that do not include different versions of the audio component.

Figure 5:
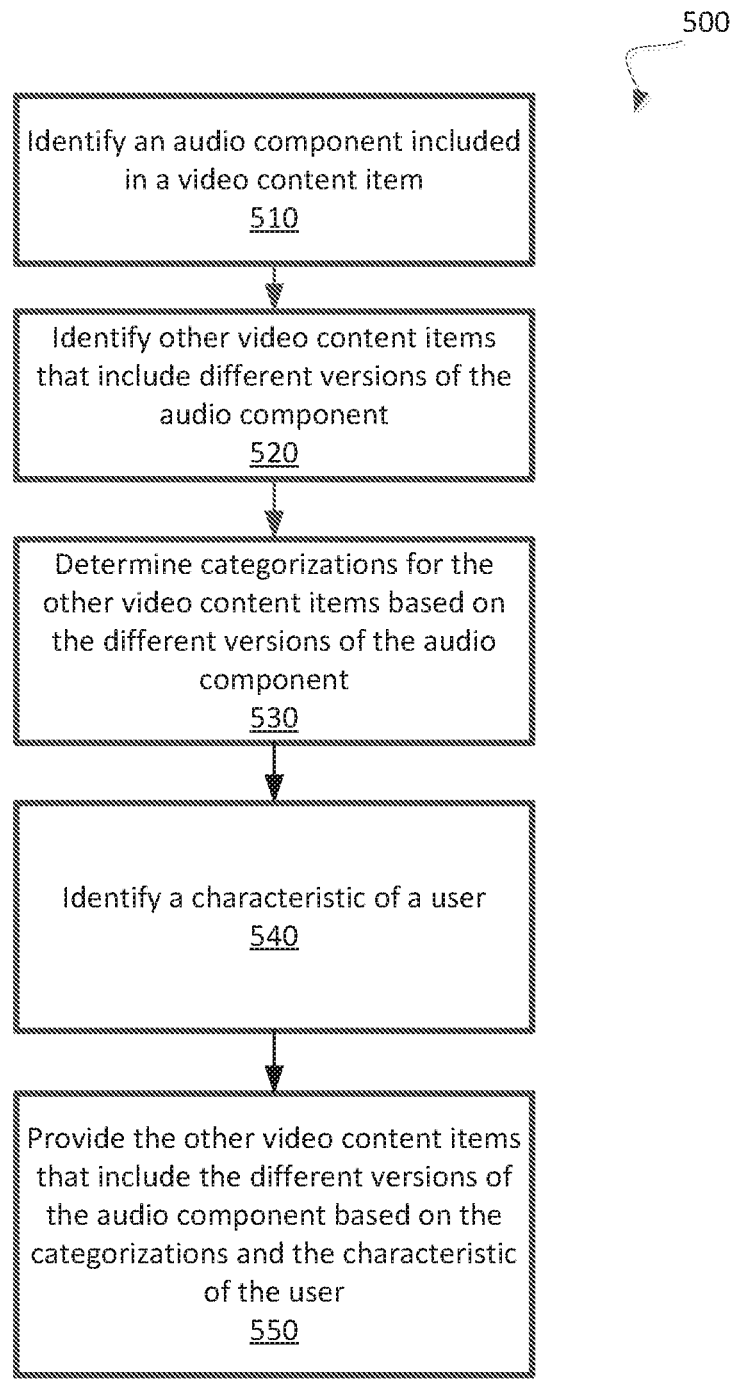
FIG. 5 is a flow diagram of an example method to provide different video content items with different versions of an audio component based on categorizations of the different video content items and characteristics of a user in accordance with some implementations.

FIG. 5 is a flow diagram of an example method 500 to provide different video content items with different versions of an audio component based on categorizations of the different video content items and characteristics of a user. The method 500 may be performed by processing logic that may comprise hardware (e.g., processing device, circuitry, dedicated logic, programmable logic, microcode, etc.), software (e.g., instructions run on a processing device), or a combination thereof. In some implementations, the method 500 may be performed by the content item recommender component 150 or 200 of FIG. 1 or 2.

As shown in FIG. 5, the method 500 may begin with processing logic identifying an audio component that is included in a video content item (block 510). For example, an audio component that is included in a video content item that is currently being provided or has been provided to a user may be identified in response to receiving an indication that the user is interested in the audio component. The processing logic may subsequently identify other video content items that include different versions of the audio component (block 520). For example, multiple video content items that each includes a different version of the audio component may be identified. The processing logic may further determine categorizations for the other video content items based on the different versions of the audio component (block 530). For example, keywords from a title and a description of each of the other video content items may be received. The categorizations for the other video content items may be based on the keywords matching particular keywords that are associated with particular categories. For example, if a title and/or description of a video content item includes the keyword 'cover' then the video content item may be categorized as a cover song version. If the title and/or description includes the keywords 'live performance' then the video content item may be categorized as a live song performance version. The processing logic may subsequently identify a characteristic of a user (block 540). For example, video content item playback of the user may be received or identified. The video content item playback of the user may indicate particular types of categories of the video content items that are more frequently viewed or accessed by the user. Furthermore, the processing logic may provide the other video content items that include the different versions of the audio component based on the categorizations and the characteristic of the user (block 550). For example, a subset of the other video content items that include a different version of the audio component may be provided (e.g., in the second portion 440 as described with regard to FIG. 4B) where the categories of the other video content items in the subset are associated with more frequently viewed by the user as opposed a second subset of the other video content items that are associated with categories that are less frequently viewed by the user.

Although aspects of the present disclosure relate to video content items, the present disclosure may also provide recommendations for other content items. For example, audio content items may be used to provide a recommendation for similar versions of an audio content item.

Figure 6:
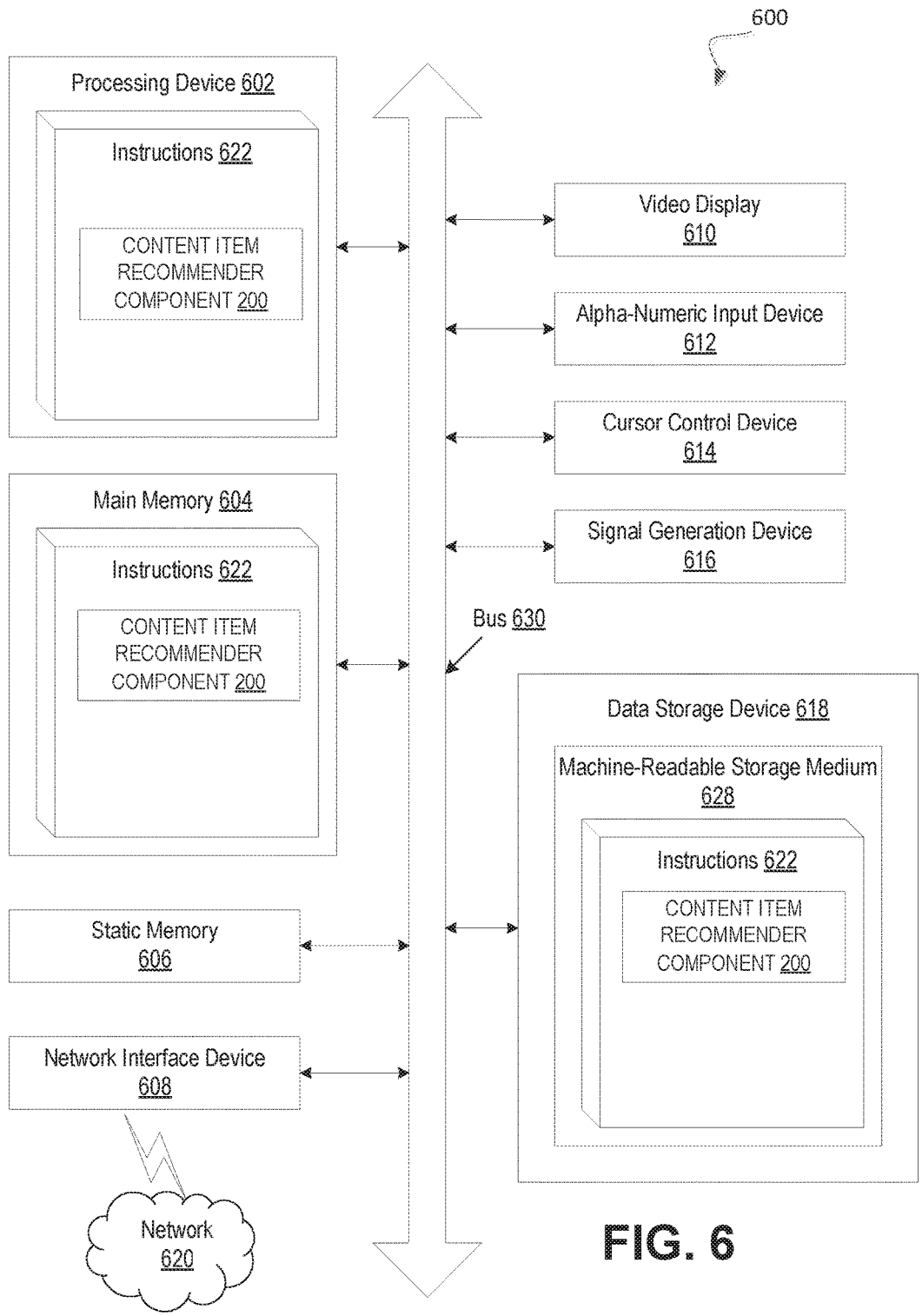
FIG. 6 illustrates a block diagram of an implementation of a computer system in which some implementations of the disclosure may operate.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or DRAM, etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628 (also known as a computer-readable medium) on which is stored one or more sets of instructions or software 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting machine-readable storage media.

In one implementation, the instructions 622 include instructions for a content item recommender component (e.g., content item recommender component 150 or 200 of FIG. 1 or 2) and/or a software library containing methods that functionality in a content item recommender component. While the machine-readable storage medium 628 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "providing" or "calculating" or "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
providing, to a user, a video content item in a first area of a graphical user interface (GUI);
providing a plurality of video content items that are related to the provided video content item in a second area of the GUI;
receiving a selection of a control element provided in the GUI and associated with the provided video content item, the selection of the control element indicating that the user is interested in an audio component that is included in the provided video content item; and
in response to receiving the selection of the control element:
identifying different versions of the audio component that are included in different video content items; and modifying, by a processing device, the second area of the GUI to prioritize a presentation of at least one of the different video content items that includes a respective different version of the audio component over a presentation of the related video content items in the second area of the GUI.

2. The method of claim 1, wherein the modifying of the second area of the GUI comprises:
providing the presentation of the at least one of the different video content items that includes the respective different version of the audio component before the presentation of the related video content items in the second area of the GUI.

3. The method of claim 1, further comprising:
determining a categorization for the at least one of the different video contents items based on the respective different version of the audio component included in the at least one of the different video content items, wherein the modifying of the second area of the GUI is based on the categorization for the at least one of the different video content items.

4. The method of claim 3, further comprising:
identifying a characteristic of the user corresponding to one or more categories associated with viewing video content items, wherein the modifying of the second area of the GUI is further based on the characteristic of the user.

5. The method of claim 1, wherein the identifying of the different versions of the audio component that are included in different video content items comprises:
identifying an audio similarity between the respective different version of the audio component that is included in the at least one of the different video content items and the audio component that is included in the provided video content item.

6. The method of claim 5, wherein the audio similarity corresponds to similar lyrics used in each of the respective different version of the audio component and the audio component included in the provided video content item.

7. The method of claim 1, wherein the identifying of the different versions of the audio component that are included in the different video content items comprises:
receiving one or more keywords associated with the at least one of the different video content items that includes the respective different version of the audio component; and
identifying a match between the one or more keywords and another keyword indicating a categorization of the at least one of the different video content items.

8. A non-transitory machine-readable storage medium storing instructions which, when executed, cause a processing device to perform operations comprising:
providing, to a user, a video content item in a first area of a graphical user interface (GUI);
providing a plurality of video content items that are related to the provided video content item in a second area of the GUI;
receiving an indication that the user is interested in an audio component that is included in the provided video content item; and
in response to receiving the indication:
identifying different versions of the audio component that are included in different video content items; and
modifying the second area of the GUI to prioritize a presentation of at least one of the different video content items that includes a respective different version of the audio component over a presentation of the related video content items in the second area of the GUI.

9. The non-transitory machine-readable storage medium of claim 8, wherein to modifying the second area of the GUI, the operations further comprise:
providing the presentation of the at least one of the different video content items that includes the respective different version of the audio component before the presentation of the related video content items in the second area of the GUI.

10. The non-transitory machine-readable storage medium of claim 8, the operations further comprising:
determining a categorization for the at least one of the different video contents items based on the respective different version of the audio component included in the at least one of the different video content items, wherein the modifying of the second area of the GUI is based on the categorization for the at least one of the different video content items.

11. The non-transitory machine-readable storage medium of claim 10, the operations further comprising:
identifying a characteristic of the user corresponding to one or more categories associated with viewing video content items, wherein the modifying of the second area of the GUI is further based on the characteristic of the user.

12. The non-transitory machine-readable storage medium of claim 8, wherein the to identify the different versions of the audio component that are included in different video content items, the operations further comprise:
identifying an audio similarity between the respective different version of the audio component that is included in the at least one of the different video content items and the audio component that is included in the provided video content item.

13. The non-transitory machine-readable storage medium of claim 12, wherein the audio similarity corresponds to similar lyrics used in each of the respective different version of the audio component and the audio component included in the provided video content item.

14. The non-transitory machine-readable storage medium of claim 8, the indication that the user is interested in the audio component that is included in the provided video content item is based on the user viewing the provided video content item at least a threshold amount of times.

15. A system comprising:
a memory; and
a processing device, operatively coupled with the memory, to:
provide, to a user, a video content item in a first area of a graphical user interface (GUI);
provide a plurality of video content items that are related to the provided video content item in a second area of the GUI;
receive a selection of a control element provided in the GUI and associated with the provided video content item, the selection of the control element indicating that the user is interested in an audio component that is included in the provided video content item; and
in response to receiving the selection of the control element:
identify different versions of the audio component that are included in different video content items; and
modify the second area of the GUI to prioritize a presentation of at least one of the different video content items that includes a respective different version of the audio component over a presentation of the related video content items in the second area of the GUI.

16. The system of claim 15, wherein to modify the second area of the GUI, the processing device is further to:
provide the presentation of the at least one of the different video content items that includes the respective different version of the audio component before the presentation of the related video content items in the second area of the GUI.

17. The system of claim 15, wherein the processing device is further to:
determine a categorization for the at least one of the different video contents items based on the respective different version of the audio component included in the at least one of the different video content items, wherein the modifying of the second area of the GUI is based on the categorization for the at least one of the different video content items; and
identify a characteristic of the user corresponding to one or more categories associated with viewing video content items, wherein the modifying of the second area of the GUI is further based on the characteristic of the user.

18. The system of claim 17, wherein to identify the different versions of the audio component that are included in different video content items, the processing device is further to:
identify an audio similarity between the respective different version of the audio component that is included in the at least one of the different video content items and the audio component that is included in the provided video content item.

19. The system of claim 18, wherein the audio similarity corresponds to similar lyrics used in each of the respective different version of the audio component and the audio component included in the provided video content item.

20. The system of claim 15, wherein to identify the different versions of the audio component that are included in the different video content items, the processing device is further to:
receive one or more keywords associated with the at least one of the different video content items that includes the respective different version of the audio component; and
identify a match between the one or more keywords and another keyword indicating a categorization of the at least one of the different video content items.

* * * * *